United States Patent [19]

Bajorek et al.

[11] 3,887,944

[45] June 3, 1975

[54] METHOD FOR ELIMINATING PART OF MAGNETIC CROSSTALK IN MAGNETORESISTIVE SENSORS

[75] Inventors: Christopher H. Bajorek, Lewisboro; David A. Thompson, Somers, both of N.Y.

[73] Assignee: International Business Machines Corporation, Armonk, N.Y.

[22] Filed: June 29, 1973

[21] Appl. No.: 375,286

[52] U.S. Cl. .................... 360/113

[51] Int. Cl. .................... G11b 5/12

[58] Field of Search ............ 340/174 EB, 174 DC, 340/174.1 F; 179/100.2 CF, 100.2 CH; 360/113

[56] References Cited

UNITED STATES PATENTS

| | | | |
|---|---|---|---|
| 3,256,483 | 6/1966 | Broadbent | 340/174 EB |
| 3,493,694 | 2/1970 | Hunt | 340/174.1 F |
| 3,519,763 | 7/1970 | Lode | 340/174.1 F |
| 3,568,180 | 3/1971 | Rosch | 360/113 |
| 3,626,396 | 12/1971 | Eastman | 340/174.1 F |
| 3,662,361 | 5/1972 | Mee | 340/174.1 F |
| 3,731,007 | 5/1973 | Masuda | 360/113 |
| 3,796,859 | 3/1974 | Thompson | 360/113 |
| 3,813,692 | 5/1974 | Brock et al. | 360/113 |

*Primary Examiner*—Vincent P. Canney
*Attorney, Agent, or Firm*—George Baron; Graham S. Jones, II

[57] ABSTRACT

Elimination of crosstalk in an integrated array of magnetoresistive reading heads by the use of regions of high coercivity material between the active areas of closely spaced magnetoresistive sensors so as to prevent flux coupling between such closely spaced sensors.

16 Claims, 7 Drawing Figures

METHOD FOR ELIMINATING PART OF MAGNETIC CROSSTALK IN MAGNETORESISTIVE SENSORS

BACKGROUND OF THE INVENTION

Magnetoresistive sensors are commonly used to detect magnetic fields. In some applications, it is desirable to gain spatial resolution by having a multiplicity of such sensors closely spaced. As the dimensions of such an array are decreased, the magnetic crosstalk between elements is increased.

Magnetic crosstalk, which is the interaction between adjacent or nearby magnetoresistive sensors, is a major factor in limiting the use of an array of magnetoresistive sensors to high track density recording. When such sensors are very closely spaced, such crosstalk introduces undesirable noise in a given read channel. Prior art magnetic sensors have employed grooves or etched regions between sensors to achieve magnetic and electrical isolation between such sensors. The isolation capability of such grooves depends on their widths. Very high track density magnetoresistive applications require that the spacing between the sensors be less than or of the order of the other dimensions. In some cases when the available space is too small, grooves or etched regions are precluded as a remedy for avoiding such crosstalk, because the groove or etched regions are of insufficient width to provide the required magnetic isolation, or because the required line width is impractically small. In the latter case, a tapped stripe, with half as many leads per element, is the required solution. For example, in an array of 50 sensors at a track density of 1,000 tracks/inch there is a separation of 0.001 inch between centers of adjacent sensors. The geometry of each sensor is such that each region under each sensor, to which a lead is connected, may constitute 20 percent or more of the sensor's area. The close proximity of the tracks and sensors means that the signals generated under one sensor will affect the orientation of the magnetization in a substantial part of an adjacent sensor. Both the spurious excitation of the magnetization in the area between the sensor and its associated lead, as well as the active regions of adjacent sensors, can give rise to substantial crosstalk noise so as to considerably diminish the array's use for effectively sensing high density magnetic information.

The present invention avoids crosstalk by magnetically deactivating the regions beneath the electrical conductors that carry electrical signals to or away from its associated magnetoresistive element. Such regions under the conductors are deactivated by degrading their permeability well below the level of that typical of the active portions of the array of magnetoresistive sensors. Lowering the permeability of the regions under the conductors is synonymous with increasing their coercivity. Permeability is defined for small magnetic signals levels, whereas coercivity is defined for signals at saturating signal levels. In what follows, "low permeability" and "high coercivity" are considered to be synonymous, and signify a decreased ability of the magnetic material to respond to the magnetic fields from the oject or medium being sensed. Sucn increased coercivity is achieved by coupling these regions to a material of high coercivity. In one embodiment, the region under the leads is deactivated by depositing on that portion of the magnetoresistive sensor that is to accept the lead a material having a high coercivity, e.g., an alloy of Ni—Co—P. Such, or similar, alloys can have coercivities in excess of 400 Oe. Exchange coupling between this alloy and the magnetoresistive region to be covered by a lead will deactivate the selected regions.

DETAILED DESCRIPTION OF THE INVENTION

Figure 1A:
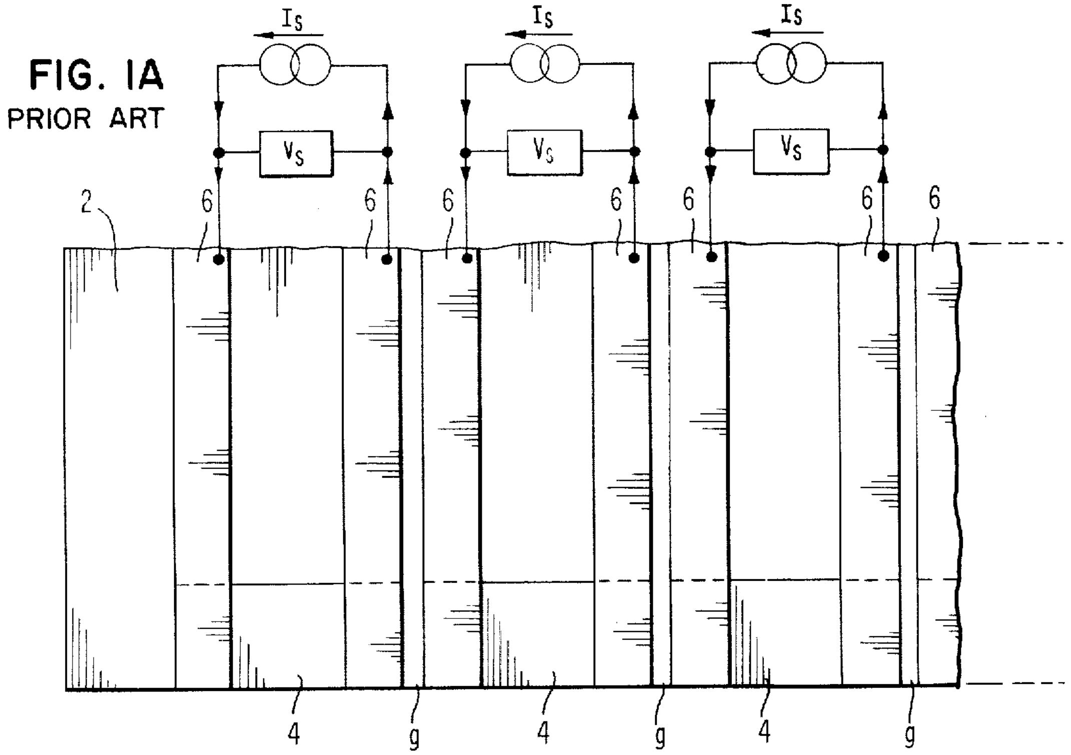
FIG. 1A PRIOR ART
FIGS. 1A and 1B illustrate prior art arrays of discrete sensors and a tapped array of sensors, respectively.
Figure 1B:
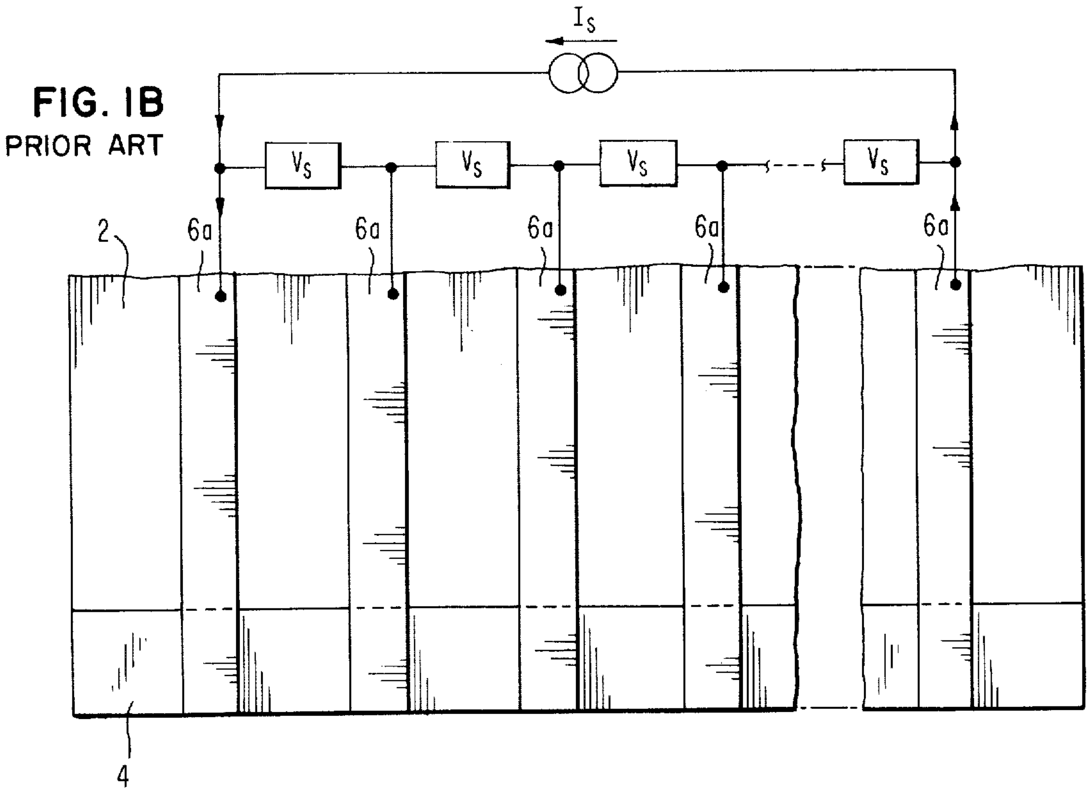
FIG. 1B PRIOR ART

FIG. 1 illustrates the two general forms of magnetoresistive arrays in the prior art. Shown in FIG. 1A is an array of discrete, independent and identical magnetoresistive elements 4. Since they are independent, each must have two leads or conductors 6 associated with them. Between adjacent sensing regions, a groove g physically and electrically isolates such regions. FIG. 1B shows the more compactly formed array, referred to as the "tapped" array. In such case, the area or region between adjacent sensors is not etched, as in FIG. 1A, but is devoted to a conductor **6*a* which shares two adjacent magnetoresistive elements. The sensing of information is achieved by the electrical circuits depicted in FIGS. 1A and 1B. A magnetic field in acting on a given element 4** changes the orientation of its magnetization, which in turn changes its resistance. This change of resistance is detected by means of a current source $I_s$ and a voltage detector $V_s$. The electrical circuitry complication that results in such sharing is somewhat offset by the easier fabrication of wider conductor lines.

Figure 2:
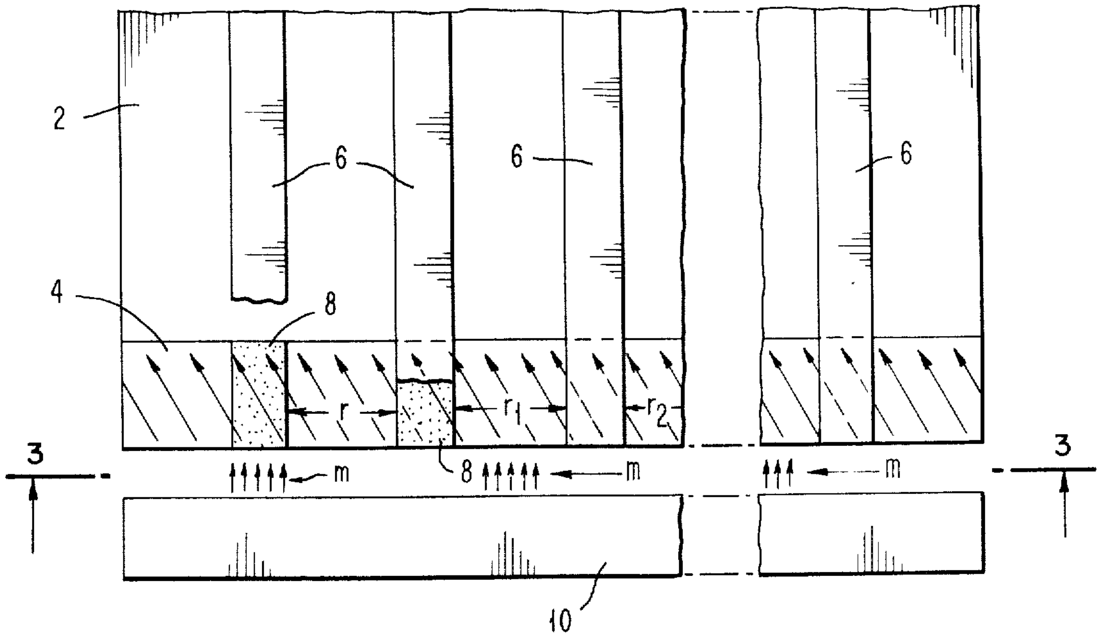
FIG. 2 is a schematic representation of the invention as applied to a tapped array of magnetoresistive sensors.
Figure 3:
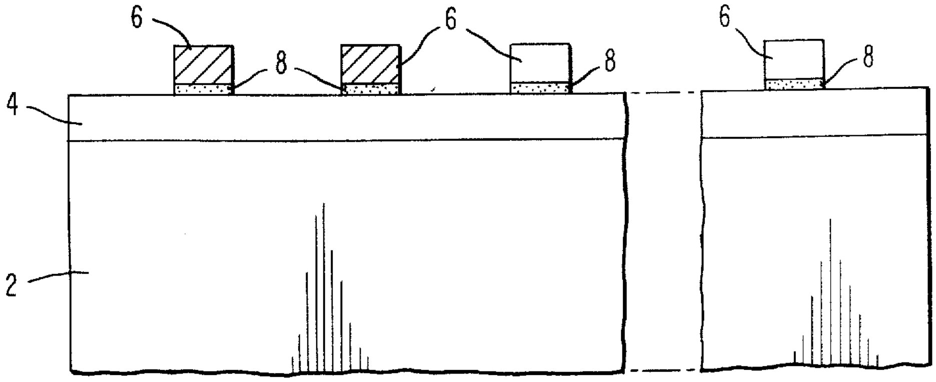
FIG. 3 is a schematic showing of how the invention is employed as a recording head.

FIG. 2 illustrates the manner in which the invention is implemented. The first layer is a substrate 2 with a nonmagnetic and non-conducting surface which is made of glass, silicon, sapphire, or the like. This substrate 2 lends support to the array of magnetoresistive elements and leads that are the active elements of the head and can be of any material that provides magnetic shielding or serves as a non-magnetic gap. An actual reading head contains many details of packaging which are necessary for providing a completed commercially useable unit. For example, the substrate 2, as described herein, may comprise one-half of the housing of such completed head as well as serving as a magnetic shield to provide increased linear resolution. Such a detailed head is described in a commonly assigned copending application for a "Magnetic Recording Head" by D. A. Thompson, Ser. No. 371,787, filed June 20, 1973, the latter being a continuation of Ser. No. 212,591, filed Dec. 27, 1971 and now abandoned, but such details are being omitted from this application in that they are incidental, rather than essential, to Applicant' s present invention. Atop of the substrate is deposited a stripe 4 of magnetoresistive material, Ni—Fe being an example of such material. The stripe 4 is about 200A thick and about 5 microns wide.

The space between adjacent conductors 6 would normally define a region r of magnetoresistive material that serves as a magnetic sensing element. In the drawing, only three such regions $r$, $r_1$ and $r_2$ are labeled, although there can be anywhere from 20 to 4,000 or more such sensing regions per inch. If region $r_1$ should have its magnetization switched or altered by the stored magnetic field m from a storage medium 10, the very same magnetic field may pass beneath a conductor 6 into an adjacent sensor region $r$ or $r_2$, causing spurious signals to occur in such regions $r$ and $r_2$. To avoid such spurious signals, the portions 8 of the magnetoresistive stripe must be deactivated, so that the magnetic paths from one region $r_1$ to another adjacent region $r$ or $r_2$ are broken.

One way in which such magnetic path can be broken is to employ an antiferromagnetic material like NiO or $\alpha$—$Fe_2O_3$ as the region 8. Such antiferromagnetic material is deposited through a mask (not shown) onto the stripe 4 prior to the deposition of its associated conductor 6. Most antiferromagnetic materials possess a very high coercivity. By exchange coupling, the portion of the stripe 4 underneath the antiferromagnetic material will have a coercivity higher than that of the uncovered stripe regions.

In yet another manner, deactivation is accomplished by using a hard ferromagnetic material such as NiCo, CoP, $\gamma$—$Fe_2O_3$ or $Fe_3O_4$, or the like, as a film portion 8 that separates conductors 6 from magnetoresistive stripe 4. Such hard ferromagnets have coercivities as high as 400 oersteds whereas the magnetoresistive stripe has a coercivity of about 2–3 oersteds. As in the above case, exchange coupling between the hard ferromagnet 8 and the magnetoresistive stripe 4 under it will increase the coercivity of the latter well above 2–3 Oe. Obviously, the magnetically stored flux from a storage medium will switch or alter the direction of magnetization in the regions $r$, $r_1$, $r_2$, etc., but will not, or only slightly, switch or alter the direction of magnetization in the deactivated portions. In general, the magnetic fields $m$ from the storage medium 10 (which is moving into or out of the plane of the drawing and the sensing regions $r$ are at right angles to that medium) that are sensed are of insufficient magnitude to significantly switch or alter the direction of magnetization of the deactivated regions, but sufficient to activate the sensing portions $r$. Since normal coercivity of regions $r$ are 2–3 oersteds, any coercivity under conductors 6 that is more than 10 times such coercivity is effective to avoid crosstalk.

In FIG. 2, the magnetization of the sensors is shown by arrows that are about 45° to the easy axis of the sensing region. This is the preferred quiescent orientation in recording applications. It corresponds to the inflection point of the ΔR vs. H response curve and thus allows for bipolar linear outputs when the sensors are excited with a sense field. Such magnetization extends even to the portions below conductors 6. It has been found that it is preferred to have the quiescent magnetic orientation remain the same under conductors 6 and use techniques for inhibiting their response or rotation to signal flux from storage medium 10, rather than to totally destroy such magnetism under the conductors. Such total destruction tends to build up undesired dipoles in the areas where the edges of conductors 6 meet its bordering magnetoresistive sensors. These dipoles may cause or contribute to Barkhausen noise. Thus, the amplitude and direction of the quiescent magnetization remains the same throughout stripe 4 but the portions under conductors 6 have their coercivities greatly increased.

It is, however, not essential to this invention that the magnitude of the magnetic moment in the inhibited region 8 be the same as in the adjacent sensor regions $r$. It may be preferable from a processing point of view to accept some mismatch in magentic moments, either because the high coercivity material adds some net moment, or because the inhibiting layer or treatment decreases the internal moment of the underlying magnetoresistive material through alloying or other chemical reaction.

The orientation of the magnetization in stripe 4, shown by the arrows, may be accomplished by a permanent magnet or electrical current in a conductor, none of which are shown, in that they do not constitute a part of this invention. Such biases are used if one wishes to operate along the linear portion of the ΔR-H plot of the magnetoresistive stripe 4. If no bias is used, then the magnetization can be orientated at any angle to the easy axis of stripe 4.

A further procedure for deactivation of the portion under a conductor 6 is to roughen the stripe 4 using a chemical treatment. For example, a mild solution of HCl is used to partially etch and thus change the coercivity of a region of stripe 4 prior to depositing a conductor 6 into that etched region.

Figure 4A:
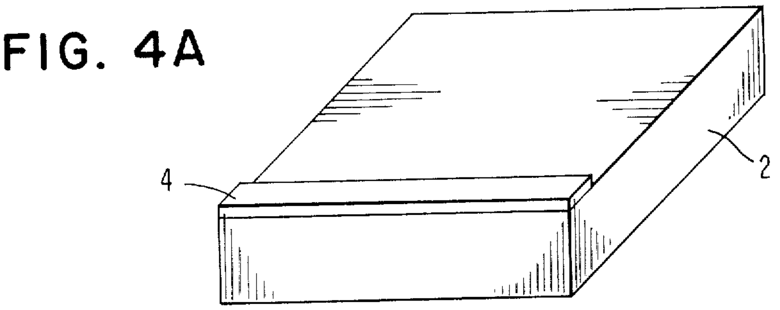
FIG. 4 consisting of FIGS. 4A, 4B, and 4C sets forth the sequential steps used in making the novel array.
Figure 4B:
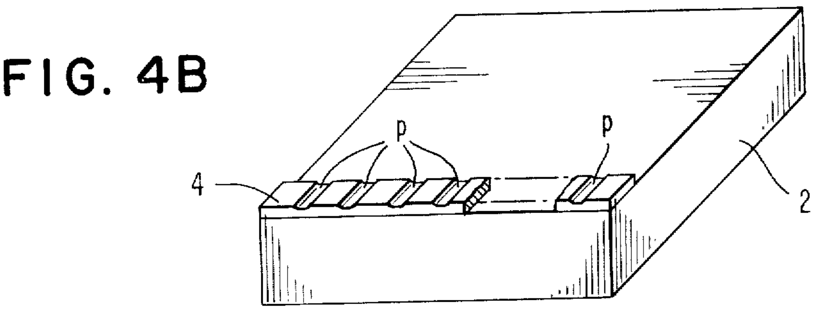
Figure 4C:
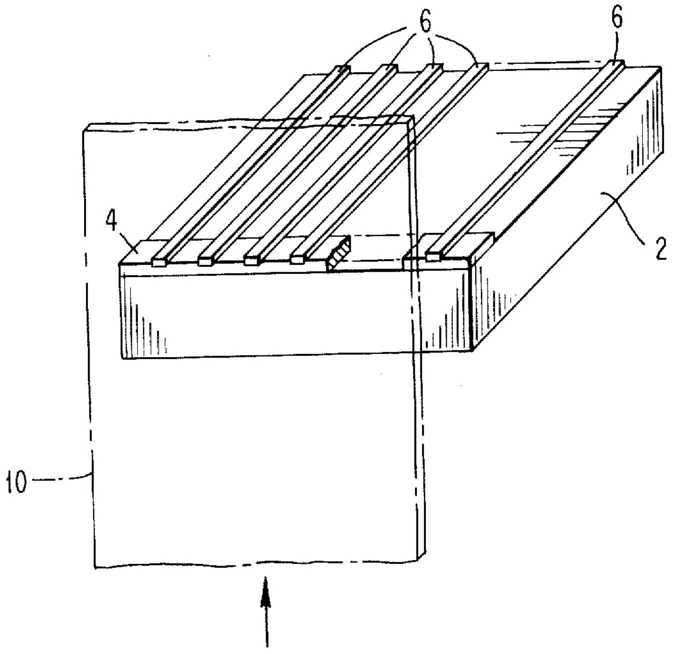

To construct the magnetic recording array for use with high track densities, one begins (see FIG. 4) with a substrate 2. Using appropriate and conventional masking and lithography techniques, a sensor of magnetoresistive material 4 is deposited, such stripe 4 being about 200A thick and about 5$\mu$ wide, although other dimensions are acceptable. Then, by any of the methods described hereinabove, portions p in the stripe 4 are altered to make their coercivities much higher or their permeabilities much lower than the unaltered portions. In the final step, conductors 6 of gold, copper, aluminum, or the like, are deposited substantially coterminously with the altered portions to produce the array. Obviously, appropriate electrical circuitry will be applied to these conductors 6 in the normal operation of the completed array.

What is claimed is:

1. An integrated array of magnetic recording elements comprising a substrate,

- a thin film of magnetoresistive material on said substrate,
- a plurality of spaced electrical conductors each of which overlaps a separate region of said magnetoresistive material, and
- a high coercivity material interposed between said magnetoresistive material and its corresponding overlapped conductors.

2. The integrated array of claim 1 wherein said high coercivity material is coterminous with the junction area of said magnetoresistive material and its intersecting conductor.

3. The integrated array of claim 1 wherein said high coercivity material has a coercivity that is at least one order higher than the coercivity of the magnetoresistive areas of said stripe that lie between said conductors.

4. The integrated array of claim 1 wherein said high coercivity materials is Ni—Co—P.

5. The integrated array of claim 1 wherein said high coercivity material is CoP.

6. The integrated array of claim 1 wherein said high coercivity material is $\gamma$—$Fe_2O_3$.

7. The integrated array of claim 1 wherein said high coercivity material is $Fe_3O_4$.

8. The integrated array of claim 1 wherein said magnetoresistive stripe is magnetized at any angle to the stripe.

9. An integrated array of magnetic recording elements comprising a substrate, a thin magnetoresistive film on said substrate, a plurality of spaced electrical conductors connected to said magnetoresistive material, and a magnetic switching inhibiting means interposed between said magnetoresistive material and each of said conductors at those regions where the conductors contact said magnetoresistive film.

10. The integrated array of claim 9 wherein said magnetic switching inhibiting means is an antiferromagnetic material.

11. The integrated array of claim 9 wherein said magnetic switching inhibiting means is $\alpha$—$Fe_2O_3$.

12. The integrated array of claim 9 wherein said magnetic switching inhibiting means is NiO.

13. The integrated array of claim 9 wherein said magnetic switching inhibiting means comprises a chemically treated region over those portions of said thin magnetoresistive film that are connected to said electrical conductors.

14. The integrated array of claim 9 wherein said magnetic switching inhibiting means comprises a material which renders said underlying magnetoresistive material less permeable by an order of magnitude or more.

15. An integrated array of magnetic recording elements comprising a substrate, a thin film strip of magnetoresistive material on said substrate, a plurality of spaced thin film electrical conductor leads spaced in an array, said leads overlapping a separate region of said magnetoresistive strip, and a plurality of high coercivity film material sections, each being interposed between said magnetoresistive strip and one of said corresponding overlapped conductor leads, each adjacent pair of said leads and said high coercivity sections comprising a separate magnetoresistive recording element in combination with the segment of said magnetoresistive strip therebetween, whereby said high coercivity material provides low magnetic field coupling between adjacent segments of said magnetoresistive strip.

16. An integrated array of magnetic recording elements comprising a substrate, a thin film strip of magnetoresistive material on said substrate, a plurality of spaced thin film electrical conductor leads spaced in an array electrically connected to said magnetoresistive material, and a plurality of magnetic switching inhibiting sections, each being interposed between said magnetoresistive strip and one of said conductors at those regions where said conductors contact said magnetoresistive film, each adjacent pair of said leads and said inhibiting sections comprising a separate magnetoresistive recording element in combination with the segment of said magnetoresistive strip therebetween, whereby said inhibiting sections provide low magnetic field coupling between adjacent segments of said magnetoresistive strip.

* * * * *